US006558151B1

(12) United States Patent
Kragle

(10) Patent No.: US 6,558,151 B1
(45) Date of Patent: May 6, 2003

(54) LOW-IMPEDANCE COMPOUND FEED EXTRUSION DIE

(75) Inventor: Harry A. Kragle, Corning, NY (US)

(73) Assignee: Corning Incorporated, Corning, NY (US)

(*) Notice: Subject to any disclaimer, the term of this patent is extended or adjusted under 35 U.S.C. 154(b) by 482 days.

(21) Appl. No.: 09/089,575

(22) Filed: Jun. 3, 1998

Related U.S. Application Data

(60) Provisional application No. 60/048,905, filed on Jun. 6, 1997, and provisional application No. 60/057,493, filed on Sep. 4, 1997.

(51) Int. Cl.[7] .......... B29C 47/12
(52) U.S. Cl. .......... 425/463
(58) Field of Search .......... 425/461–463, 425/197–199; 264/177.12, 209.1, 209.8

(56) References Cited

U.S. PATENT DOCUMENTS 3,790,654 A 2/1974 Bagley
3,846,197 A 11/1974 Wiley
4,118,456 A 10/1978 Blanding et al.
4,242,075 A * 12/1980 Higuchi et al. .......... 425/462
4,321,025 A * 3/1982 Cunningham .......... 425/131.1
4,465,454 A 8/1984 Duerr et al.
5,066,215 A * 11/1991 Peters et al. .......... 425/464
5,702,659 A * 12/1997 Kragle et al. .......... 264/177.11

FOREIGN PATENT DOCUMENTS

EP 0 776 743 6/1997

* cited by examiner

*Primary Examiner*—Mark Eashoo
(74) *Attorney, Agent, or Firm*—Kees van der Sterre

(57) ABSTRACT

A honeycomb extrusion die constructed from a strengthening base plate comprising a relatively small number of large feedholes and thin die body plate comprising a larger number of relatively small feed holes supplying extrudable material to a discharge slot array, wherein the two plates are connected by an intermediate compound feed section incorporating branching feed conduits arranged to provide an extrusion path of low flow impedance between the large base plate feed holes and the smaller body plate feed holes.

3 Claims, 1 Drawing Sheet

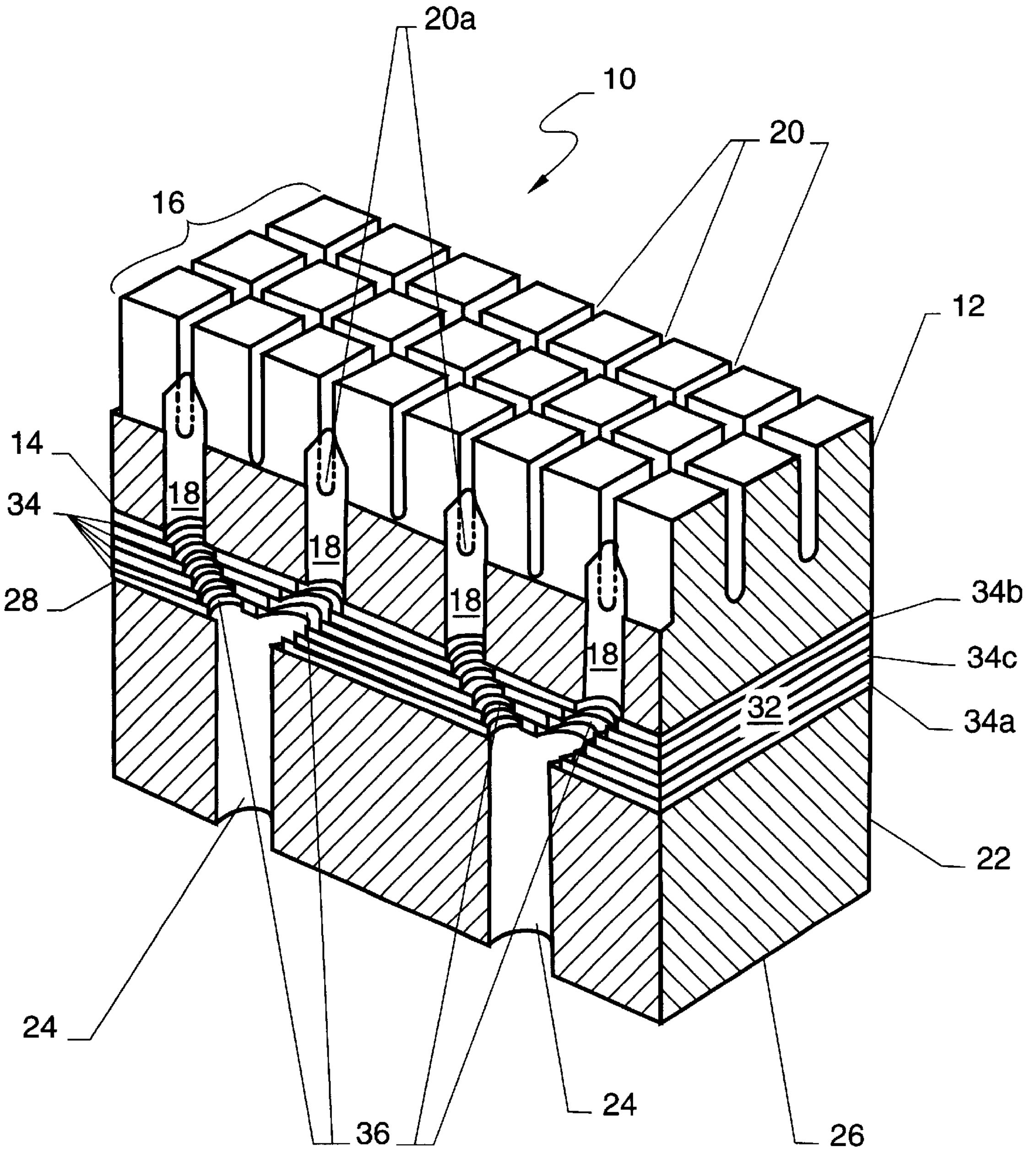
20a
10
20
16
12
14
34
18
18
18
18
28
34b
34c
32
34a
22
24
24
36
26

LOW-IMPEDANCE COMPOUND FEED EXTRUSION DIE

This application claims the benefit of U.S. Provisional Application No. 60/048,905, filed Jun. 6, 1997 and Provisional Application No. 60/057,493, filed Sep. 4, 1997, both entitled "Low Impedance Compound Feed Extrusion Die", by Harry A. Kragle.

BACKGROUND OF THE INVENTION

The present invention relates to honeycomb extrusion dies, and more particularly to an improved design for a honeycomb extrusion die offering enhanced extrusion performance at relatively low extrusion pressures.

In conventional form, honeycomb extrusion dies comprise a die body having an inlet face and an outlet face, with the inlet face incorporating a plurality of feedholes extending through the die body toward the outlet face. These feedholes terminate within the interior of the die body at the bases of a plurality of criss-crossing, interconnected discharge slots formed in the die outlet face. Extrudable material forced into the feedholes at the inlet face of the die and supplied to the bases of the slots expands and knits to fill the interconnected slot space and is subsequently discharged from the slot openings at the outlet face of the die as an interconnecting wall structure which forms the channel walls of an extruded monolithic honeycomb.

Important applications for honeycomb extrusion dies are in the manufacture by extrusion of honeycomb SCR (selective catalytic reduction) catalysts for the control of nitrogen oxide emissions from electrical power plants and in the manufacture of ceramic honeycombs for the support of emissions control catalysts in the exhaust systems of automobiles. In each case, manufacture involves the preparation of a plasticized batch comprising powdered ceramic materials, the extrusion of the plasticized batch through the die to form a green honeycomb shape, and the firing of the green honeycomb shape to produce a strong cellular catalyst or ceramic catalyst support.

An example of a conventional extrusion die design for the manufacture of ceramic honeycombs is disclosed in U.S. Pat. No. 3,790,654 to Bagley. An extrusion die type known as a "compound feed" die, wherein the feedhole portion of the die is an assembly of two or more separate feedhole plates, is disclosed in U.S. Pat. No. 4,118,456. In the latter design, a primary feedhole plate forming the inlet portion of the die comprises a limited number of relatively large feedholes, while a secondary feedhole plate positioned behind the primary plate comprises a larger number of smaller feedholes, the smaller feedholes providing channels for conveying extrudable material from the larger feedholes to the discharge slots.

One of the problems encountered in the extrusion of plasticized inorganic powder batches of metallic or ceramic material is that of high extrusion back-pressure. Batch viscosity must be maintained at a sufficiently high level to insure that, once extruded, the honeycomb extrudate does not slump or otherwise deform in the course of subsequent processing. At the same time, the complex flow paths presented by conventional extrusion dies designed for finely structured honeycomb extrusion greatly increase the pressure required to force plasticized material through the die.

These factors substantially increase the forces sustained by extruder seals, shafts and housings. They also increase the sensitivity of the process to imperfections in surface finish or other manufacturing imperfections in the dies and other forming hardware used for extrusion. Avoiding production difficulties arising from these sources requires the use of more expensive extrusion equipment than would otherwise be required. For example, it is difficult to develop the extrusion pressures required for continuous fine (thin-wall) honeycomb extrusion using a single-screw extruder alone. Instead, twin-screw extruders or pressure-boosting pumping equipment must be used, or resort must be made to discontinuous batch extrusion approaches such as ram extrusion.

Many of these difficulties could be minimized or avoided if a die design offering reduced impedance to plasticized batch flow at high batch viscosities could be developed. It is one object of the present invention to provide such a die. Other objects and advantages of the invention will be apparent from the following description.

SUMMARY OF THE INVENTION

The present invention provides a honeycomb extrusion die of an improved compound feed design. That design permits honeycomb extrusion to be carried out at significantly reduced extrusion pressures. For example, instead of requiring ram extrusion or extrusion using a high pressure extrusion apparatus such as a twin screw extruder or an extruder with a auxiliary gear pump or other pressurizing system, high-viscosity batch materials can be extruded by means of a low-pressure single screw extruder or the like.

The extrusion die of the invention first comprises a thin, unitary, low impedance die body constituting the forming section of the die. That section comprises a die body inlet face and an opposing die discharge face, the inlet face incorporating a plurality of body feedholes extending therefrom toward the discharge face, and an intersecting array of discharge slots extending from the discharge face toward the inlet face. To control and limit flow impedance in this section of the die, the body feedholes overlap, i.e., extend into and terminate beyond the base portions of, the discharge slots.

While having a configuration similar to that of a conventional honeycomb extrusion die, the die body is of limited thickness in order to limit flow impedance. In addition, it features a relatively densely packed array of feedholes, as required to adequately supply the closely spaced discharge slots needed to form an extruded honeycomb of relatively high channel or cell density. Thus the die body alone does not normally have the thickness and strength necessary to withstand significant extrusion pressures without deformation or breakage.

The major strength component of the extrusion die of the invention is a-high-yield-strength die baseplate for supporting the die body. The die baseplate comprises a plurality of baseplate feedholes extending through the baseplate from a die inlet face toward an opposing baseplate outlet face. While substantially larger in diameter than the die body feedholes, to reduce flow impedance and increase the flow volume of batch material toward the die body, the baseplate feedholes are substantially fewer in number and more widely spaced than the die body feedholes. The wider feedhole spacing helps to maintain the strength of the die baseplate at levels adequate to support the extrusion pressure exerted on the die.

To provide a low-impedance interconnection between the die body feedholes and the baseplate feedholes, a compound-feed section is disposed between the die body and the die baseplate. The function of the compound-feed section is to divide and redirect the feedstream from each baseplate feedhole so that it can supply multiple die body feedholes. At least two and more typically four or more separate feedstreams will be created from each baseplate feedstream within the compound feed section of the die.

In principle, the compound feed section could comprise a specially machined die section wherein each inlet channel for a baseplate feedstream divides or branches to form multiple outlet channels to supply the die body feedholes. The branching feed conduits would have inlets connecting with the baseplate feedholes, and a larger number of outlets connecting with the body feedholes. Generally, branching requires that the conduits be angled away from the flow axes of the baseplate feedholes over at least a portion of their length, in order to connect each baseplate feedhole with a plurality of die body feedholes. Such a branching channel structure could be formed in a separate plate to be bonded to the die baseplate and body, or it could be machined directly into the baseplate or even within the die body.

However, in a particularly advantageous embodiment of the invention the compound feed section incorporates a multilayer feed-compounding section to provide the array of branching feed conduits. Disposed between and joining the die body to the die baseplate, this multilayer section is formed as a stacked plurality of thin plates, the branching feed conduits being formed within the stack by combinations of substantially aligned but successively offset, flow-dividing and/or flow-redirecting openings in succeeding ones of the plates.

The plates in this die design will include an inlet plate, joined to the baseplate and having an opening or openings in substantial registry with the baseplate feedholes, and a terminal plate joined to the die body, having openings in substantial registry with the body feedholes. Each branching conduit formed by the inlet, terminal, and intervening plates will connect one baseplate feedhole to multiple body feedholes. In a specific preferred embodiment each of a majority of the baseplate feedholes is connected by branching conduits to at least four body feedholes.

In a further aspect, the invention includes a method for forming a honeycomb structure from a plasticized batch material by extrusion through the honeycomb extrusion die of the invention. Among the advantages of this method is the relative ease with which the extrusion of batch material through this die may be accomplished.

The method of the invention comprises first flowing the batch material into a plurality of feedholes extending into a baseplate for the die. These feedholes are of relatively large diameter to reduce flow impedance caused by the baseplate.

Batch material traversing the baseplate feedholes is next caused to flow into the connecting inlets of a plurality of compound feed conduits in a compound feed section of the die. In the method of the invention, this flow of batch material through the compound feed conduits involves flow through branching portions of the conduits which are angled away from the flow axes of the baseplate feedholes over at least portions of their lengths. This angling reduces "dead spaces" and flow impedance as the streams of batch material are compounded and delivered to multiple feed outlets. The compound feed section may be formed within the baseplate but is more preferably a separate section connected thereto.

Batch material flowing from the feed outlets in the compound feed section is next caused to flow into a connecting array of body feedholes formed in a unitary die body extending from or, more preferably, attached to the compound feed section. The body feedholes are more numerous but smaller in diameter than the baseplate feedholes as a result of conduit branching within the compound feed section.

After flowing through the body feedholes the batch material is caused to flow into an intersecting array of discharge slots formed in a discharge face of the unitary die body. As noted above, to reduce flow impedance in this step, the body feedholes extend into and terminate within base portions of the discharge slots to facilitate easy lateral flow of the batch material within the slots. The batch material is then flowed from the discharge slots to exit the discharge face of the extrusion die as a channeled honeycomb body.

DESCRIPTION OF THE DRAWING

The invention may be further understood by reference to the drawing, which is a schematic perspective view in partial cross-section of a segment of a low-impedance compound feed die provided in accordance with the invention.

DETAILED DESCRIPTION

In the particular extrusion die design illustrated in the drawing (which is intended to be illustrative rather than limiting), honeycomb extrusion die 10 includes a primary honeycomb-forming element consisting of a unitary die body 12. That die body includes a die body inlet face 14, an opposing die discharge face 16, and a plurality of body feedholes 18 formed in the die body and extending from the inlet face toward the discharge face.

Also formed within die body 12 is an intersecting array of discharge slots 20, those slots extending from discharge face 16 toward the inlet face and toward body feedholes 18. The depths of body feedholes 18 and discharge slots 20 are sufficient to insure that feedholes 18 extend beyond the bases and into the lower portions 20*a* of the discharge slots in an overlapping manner. This overlap enables relatively low impedance transfer of plasticized batch material from the body feedholes into the discharge slots where it can flow transversely to knit and form the interconnecting wall structure of a honeycomb body prior to discharge from the die.

A further element of the die design of the drawing is die baseplate 22. Baseplate 22 comprises a plurality of relatively large and widely spaced baseplate feedholes 24 extending through the baseplate from a die inlet face 26 to an opposing baseplate outlet face 28. This baseplate is relatively thin but strong, providing necessary support for the die body while still facilitating the relatively low pressure transfer of extrudable material from the inlet face to the baseplate outlet.

In addition to the die body and die baseplate, the illustrative extrusion die of the drawing comprises a multilayer compound-feed section 32 disposed between and joining die body 12 to die baseplate 22. Compound-feed section 32 comprises a stacked plurality of thin plates 34, the plates forming an array of branching feed conduits 36 formed by substantially aligned but offset openings in the plates. The plate stack includes an inlet plate 34*a* joined to baseplate 22 and having openings in substantial registry with the baseplate feedholes. It also includes a terminal plate 34*b* joined to the die body 12, plate 34*b* having openings in substantial registry with die body feedholes 18.

The fact that baseplate feedholes 24 are fewer in number but significantly larger in diameter than body feedholes 18 is important since it permits plasticized batch material to traverse a substantial portion of the thickness of the die (i.e., the thickness of baseplate 22) through relatively large feedholes, reducing the impedance to batch flow presented by the die as a whole. A further benefit is that the cost of die fabrication is somewhat reduced because the machining of the feedholes comprises a significant part of the cost of producing the die.

Although only two branches are shown in the die cross-section illustrated in the drawing, each baseplate feedhole 24 in this compound feed design may conveniently be connected by branching conduits 36 to four body feedholes 18. Other branching arrangements, connecting each baseplate feedhole to two body feedholes, or to three or more body feedholes may alternatively be used, or combinations of branching arrangements could be used in a single die.

While each baseplate feedhole could theoretically be connected to an unlimited number of body feedholes by means of feed conduits having multiple branching levels, the requirement of low flow impedance in the die of the invention imposes a practical constraint on the number of body feedholes which can be supplied from each baseplate feedhole. This is because the branches themselves create backpressure in the feed stream, tending to cancel the backpressure gains resulting from the use of a large feedhole baseplate design.

In addition to this limit there is a further requirement that the walls in the feed conduits through the compound feed section be relatively smooth, to avoid undue pressure drop across the section. In a multilayer compound feed section such as shown in the drawing, this requires the inclusion of one or more "non-branching" plates in the stack. Non-branching plates are plates such as plates 34_a_ and 34_b_ in the drawing which, unlike branching plate 34_c_, contain the same number of openings as the preceding plate or die section. Such plates do not sub-divide the feed stream but simply re-position the stream via slight hole offsets from a preceding hole set, reducing flow resistance caused by "dead spaces" in the flow stream. It is in part this use of non-branching plates which permits the achievement of flow impedances significantly below those of conventional compound feed dies.

The use of relatively thick plates in a compound feed section such as shown in the drawing would also undesirably increase the overall impedance of the die design. For this reason, plate thicknesses in feed sections of this type will generally not exceed 0.020 inches (500 μm), and are more typically 0.005–0.010 inches (125–250 μm) in thickness. Plates down to 0.002 inches (50 μm), or even less, may in principle be used.

The extrusion dies of the invention may be fabricated from essentially any machineable or shapeable solid material having good wear resistance and strength adequate to withstand the normal forces of extrusion. However, the preferred materials are machineable steel materials, including ferritic, austenitic and/or martensitic tool steels, hardenable tool steels, stainless steels, and other steel alloys. To minimize the thickness of the die, each of the die baseplate and die body may be hardened for higher yield strength after machining.

The thin plates of the feed-compounding section may be formed of the same materials as the other sections of the die. The hole arrays in these plates may be formed by conventional machining techniques, or by photolithographic methods involving the chemical machining of hole patterns formed in photoresist coatings applied to the plates. The latter methods permit accurate relative positioning of large arrays of openings in the successive plates in this section of the die.

The machining of the die body and die baseplate may be accomplished by conventional mechanical, electrochemical and/or electrical discharge machining methods. Gun-drilling, electrochemical drilling, and wire electrical discharge slotting in particular comprise suitable techniques. The resulting parts ray then be assembled and bonded together into an integral extrusion die by conventional bonding methods such as soldering, brazing or diffusion bonding. U.S. Pat. No. 3,678,570 to Paulonis et al. describes one suitable diffusion bonding procedure, particularly useful for superalloy and stainless steel bonding, wherein thin alloy interlayers are used to assist the diffusion bonding process through the formation of a transient liquid phase. These interlayers promote good diffusion bonding of similar materials at temperatures and pressures somewhat lower than required for conventional diffusion processes. Alternatively, the die assembly may be bolted or otherwise fastened together by mechanical means.

The die designs and extrusion methods of the invention offer significant reductions in extrusion pressure, particularly at honeycomb channel densities and channel wall thicknesses where such pressure can become a significant factor affecting honeycomb production costs. Thus these designs and methods permit the use of less expensive extrusion equipment, or the continued use of existing equipment, for the manufacture of thinner-walled honeycombs of higher cell density currently being required for the most advanced honeycomb applications. Extruder maintenance expense and some die production costs may also be reduced.

I claim:

1. A honeycomb extrusion die comprising:

a unitary die body having a slotted die discharge face and an opposing die body inlet face, the inlet face being provided with a plurality of body feedholes extending into the die body toward the discharge face and an intersecting array of discharge slots extending from the discharge face toward the inlet face, the feedholes extending into and terminating within the base portions of the discharge slots;

a die baseplate forming a die inlet face, the inlet face comprising a plurality of baseplate feedholes extending into the baseplate; and a compound feed section positioned within or between the baseplate and the die body, the compound feed section incorporating feed conduits having (i) inlets connecting with the baseplate feedholes, (ii) outlets connecting with the body feedholes, and (iii) being angled away from the flow axes of the baseplate feedholes over at least a portion of their length;

the baseplate feedholes having a diameter larger than the body feedholes, the number of body feedholes substantially exceeding the number of baseplate feedholes, and each baseplate feedhole being connected by the branching feed conduits to multiple body feedholes.

2. A honeycomb extrusion die in accordance with claim 1 wherein the compound feed section incorporates one or more non-branching thin plates.

3. A honeycomb extrusion die in accordance with claim 1 wherein the majority of the baseplate feedholes are connected by branching conduits to at least four body feedholes.

* * * * *